United States Patent
Hendrickson et al.

[19]

[11] Patent Number: 6,148,640
[45] Date of Patent: Nov. 21, 2000

[54] METHOD FOR MAKING CHOPPED FIBER

[75] Inventors: Harold Miles Hendrickson, Delta; Randall Clark Bascom, Wauseon, both of Ohio

[73] Assignee: Johns Manvill International, Inc., Denver, Colo.

[21] Appl. No.: 09/128,194

[22] Filed: Aug. 3, 1998

[51] Int. Cl.[7] .................................................. C03B 37/16
[52] U.S. Cl. ............................................. 65/480; 264/145
[58] Field of Search ......................... 65/438, 475, 479, 65/480, 504, 533, 535, 536, 452; 264/145

[56] References Cited

U.S. PATENT DOCUMENTS

| | | | |
|---|---|---|---|
| 3,869,268 | 3/1975 | Briar et al. ................................. | 65/452 |
| 4,071,340 | 1/1978 | Melle ......................................... | 65/536 |
| 4,194,896 | 3/1980 | Symborski et al. ...................... | 65/377 |
| 4,411,180 | 10/1983 | Roncato ..................................... | 83/37 |
| 4,511,095 | 4/1985 | Ideno et al. ........................... | 242/474.3 |
| 4,551,160 | 11/1985 | Frailey et al. ............................ | 65/480 |

*Primary Examiner*—Sean Vincent
*Attorney, Agent, or Firm*—John H. Miller

[57] ABSTRACT

In a method of chopping fiber from a leg containing three or more fiberizers, prior to stopping the chopper for maintenance all of the strands are first removed from the chopper and put into a single set of pull rolls located near the chopper where the strands are pulled while the chopper is down. When the chopper is started back up the strands are more quickly started back into the chopper avoiding the considerable walking and time required in the conventional method of restarting strands from a leg of fiberizers back into a chopper. One of the pull rolls is free to move away from the other roll, but is biased against moving away to provide the grip needed to pull many strands at the same time.

12 Claims, 7 Drawing Sheets

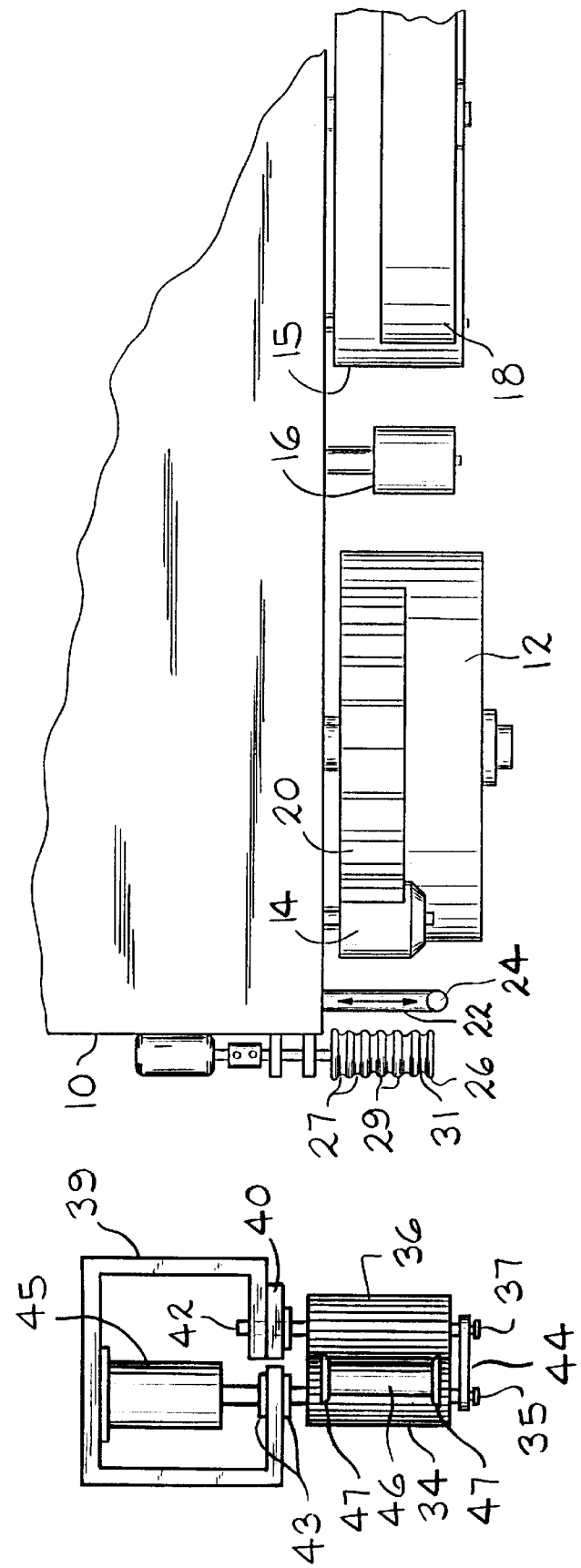

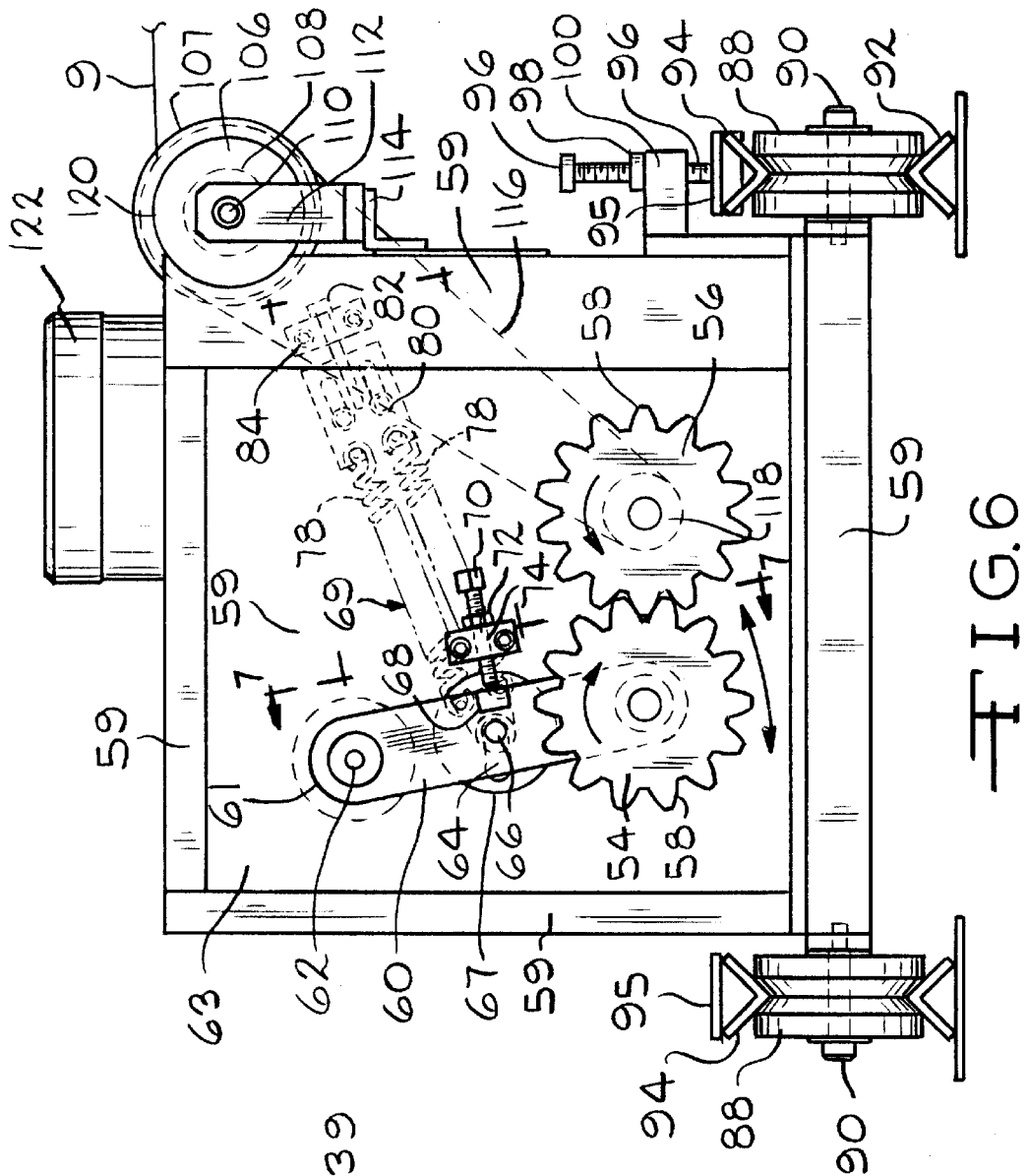
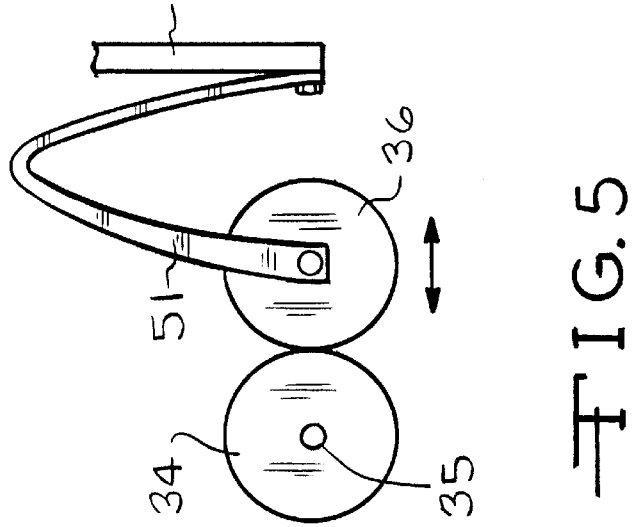

METHOD FOR MAKING CHOPPED FIBER

The present invention involves apparatus for use in manufacturing fiber products like chopped fiber, chopped strands of fiber and other fiber products and a method of using the apparatus to improve the productivity of fiber operations. More particularly, the apparatus involves a pull roll assembly for pulling one or a plurality of fibers or fiber strands from each of a plurality of fiberizing bushings and a method of using a pull roll assembly to increase the productivity and material efficiency of a fiber operations.

In the manufacture of chopped fiber, such as chopped glass fiber, molten glass is extruded through tips or holes in the bottom of a plurality of precious metal boxes or fiberizing bushings, forming molten cones and fibers are pulled rapidly to attenuate the molten fiber to the desired fiber diameter. The molten or soft fibers cool rapidly as they are sprayed with water, coated with a chemical sizing and are pulled at speeds exceeding thirty miles per hour by the fiber chopper to be chopped into chopped strands, each containing hundreds or thousands of fibers. The chopped strands are dried to make reinforcements for plastics or left wet for use in paper or mat machines to make nonwoven fiber glass mats and paper. Typical methods used in industry to make chopped strands or fiber are disclosed in U.S. Pat. Nos. 3,815,461, 4,194,896, and 4,576,621, the disclosures of which are incorporated herein by references.

Fiber breaks occur below the molten cones, meniscus, due to stones or other discontinuities in the molten glass, and sometimes after the fiber cools due to a weakness in the fiber or a problem with the strand guiding or treating equipment. Typically, when one or a few fibers break, very soon all of the fibers break necessitating a restart of the bushing. While the bushing is beading out and getting into condition to be restarted, called "hanging", the thermodynamics around the bushing are much changed from the thermodynamics while running. The bushing bottom tends to heat up because it is no longer being cooled by ambient air rushing in to fill a partial vacuum created when the rapidly moving fibers carry air downwardly with their surfaces. This heating up of the bushing bottom causes a higher output of glass. Although some known techniques can be used to slow down this heating up of the bushing bottom, they do not stop this undesirable result.

The longer the bushing is hanging, the greater the increase in temperature of the bottom of the bushing and the molten glass inside the bushing near the bottom. Then, when the bushing is restarted, because the molten glass coming through the tips is hotter than desired, the melt rate is increased which causes two undesirable results. First, the fiber diameter is increased, but more importantly, the glass temperature can be too hot to form fibers, especially if the bushing has hung for more than a minute or two. To form fibers, the viscosity, and temperature, must be within a definite range. If the viscosity is too low, the ratio of surface tension to viscosity is such that the surface tension of the glass, etc. pulls the molten glass into a sphere, breaking or preventing the desired fiber. To maximize productivity, glass is fiberized at a temperature very near the maximum fiberizing temperature. Therefore, heating of the glass above this temperature can result in a condition, especially in the hottest cones or meniscus, where fiber won't form, causing an immediate breakout upon restarting of the bushing.

The most common event causing excessive hang time on bushings is downtime on the chopper. The chopper can malfunction like any other piece of high speed equipment, but additionally, the chopper must be taken down periodically to replace wearable equipment. Prior the present invention, when the chopper was taken down, all of the bushings being pulled by the chopper, usually a full leg of 5–25 bushings, normally 10–15, were broken out and permitted to hang until the chopper was running again. A hanging bushing is one that is flowing coarse, primary fibers slowly into a basement scrap or recycling system. Once the chopper was running again, the bushings, one at a time, were restarted by feeding the fiber strand from the bushing into the chopper. If a bushing had become overheated because of the length of the downtime, that bushing would have to be restarted, sometimes several times, before it would run without breaking out. This restarting of all the bushings took significant time because the bushings were from a few feet to as much as about 38 feet or more from the chopper, and the operator had to walk to the bushing from the chopper, grab the hanging strand, walk it back to the chopper and guide it through the chopper start up path.

It is well known to use a set of pull rolls below each bushing on a double level operation, as shown by U.S. Pat. No. 4,194,896. On a two level operation the bushings and the bushing operator are on the top level and strand winders and/or choppers and operator(s) for this equipment are on a second, lower level. The bushing operator starts a bushing and achieves a strand ready for starting, but the operator on the lower level may not be available to take the hand-off to start the new strand into a winder or chopper. The new strand must be pulled continuously or the bushing will break out again. To allow this, a set of slowly running rolls are mounted on the lower level. The bushing operator puts the new strand into the pull rolls below where it is slowly pulled continuously until the winder or chopper operator can remove it and insert it into a chopper or winder. It is also known to use a set of pull rolls below each bushing in conjunction with a self starting winder as disclosed in U.S. Pat. Nos. 4,362,260 and 4,511,095.

U.S. Pat. No. 3,869,268 shows a set of pull rolls mounted above a chopper for the purpose of starting a new strand or strands and accelerating the strand(s) up to the desired attenuation speed prior to the strands being inserted into the chopper for chopping. This patent shows a chute for directing the new strand(s) to a waste chute, but when running in this mode the strands would prevent the removal and replacement of the blade roll and backup roll on the chopper.

SUMMARY OF THE INVENTION

For purposes of describing this technology, glass fiber will be described, but it is to be understood that the present invention is applicable to all types of man made or natural fiber and fiber strands pulled essentially continuously like nylon, polyester, and other plastics or polymers, other molten inorganic and organic materials that will fiberize, and cellulosic materials like rayon, etc. A fiber strand or strand, as used herein, means two or more fibers and usually several hundred or several thousand fibers in parallel. Normally, the present invention will be used with chopping equipment that cuts, breaks or shears the fiber or strands into various lengths dictated by subsequent processes and products that use the chopped products. It would also be useful with any equipment that receives a plurality of fiber strands from a plurality, such as three or more, bushings, and processes them into a fiber product, such as by winding, dispersing onto a conveyor, etc. to form a mat or blanket, or some other processing equipment.

The present invention includes a fiberizing system for fiberizing molten material comprising three or more, four or more preferably five or more, fiberizers for converting the molten material into a plurality of fibers to make at least one fiber strand from each fiberizer. Preferably, the fiberizers are aligned along a line of travel for the strands to be pulled by a strand processor like a chopper. The system includes a turning device located below at least some of said fiberizers for turning one or more strands coming from the fiberizer and a chopper having a pull roll and a blade roll for chopping the strands into short lengths. The present invention comprises a set of pull rolls located between a plane that intersects the strands and passes vertically through a center line of a fiberizer closest to the chopper and the chopper wherein at least one of the pull rolls is driven, the axes of the two pull rolls being below and upstream of the axes of both the back up roll and the blade roll of said chopper. At least one of the pull rolls is driven and one of the pull rolls is biased against the other pull roll by any known biasing means to provide enough friction between the surfaces of the pull rolls and the three or more, four or more or five or more strands that the strands will not slip against the moving pull rolls. Preferably the surface of at least one of the pull rolls, and preferably both, are knurled, textured, serpentined or sawtoothed to better grip the fibers or fiber strands.

Optionally, the set of pull rolls can have a rotatable guide roll that is either free wheeling or driven by any suitable means. Also optionally, the set of pull rolls can be mounted on wheels, preferably riding on metal rails, or other known mechanisms that would allow the set of pull rolls to be moved back and forth between a working position and a waiting position.

The present invention also includes a pull roll assembly comprising two pull rolls, at least one of which is driven rotatably, an outer circumferential surface of one of the pull rolls being biased towards an outer circumferential surface of the other pull roll to prevent strands from slipping between the nip of the two pull rolls, and a guide roll mounted vertically above the nip of the two pull rolls.

The set of pull rolls, pull roll assembly, can be used in a number of ways to improve the material efficiency and productivity of the fiber process. Its main use is to keep the three or more, four or more or five or more fiber strands pulling at the same time while the strand processor is being repaired or rebuilt, but it can also be used to pull the off quality end portion of each new strand into a waste system after the new strand is started up. Both of these uses reduce the work load on the operator and one of the uses allows the strands to be started into the strand processor such as a chopper much faster when the strand processor is started back up than was possible with the prior art process and system.

The present invention also includes an apparatus for biasing a pivoting or swinging member of any kind comprising an end plate for attaching to a pivoting member or to a frame, a tension spring attached to said end plate and to a second end plate, said second end plate being attached to a take up and let out assembly, said assembly having a member for attaching to a frame or to said pivoting member. This biasing apparatus is a key component of the preferred set of pull rolls apparatus.

BRIEF DESCRIPTION OF THE DRAWINGS

FIG. 4 is a top view of the pull roll apparatus and chopper shown in FIG. 3.

FIG. 5 is a front view of the set of pull rolls of the present invention with an alternative mechanism for biasing one pull roll against the other.

FIG. 6 is a front view of a preferred embodiment of the pull roll apparatus of the present invention.

DETAILED DESCRIPTION

The apparatus and method of the present invention is applicable to any fiber chopping or processing operation that pulls one or more fibers or strands of fibers from a plurality, at least three and preferably at least 5, individual sources of fiber, strand or fiberizers together to chop, wind, or otherwise process the fibers or fiber strands. For purposes of simplifying the description, the present invention is shown and described as part of a continuous fiber making operation, preferably making glass fiber, followed by chopping strands of the fiber into desired lengths, as shown in FIG. 1.

Figure 1:
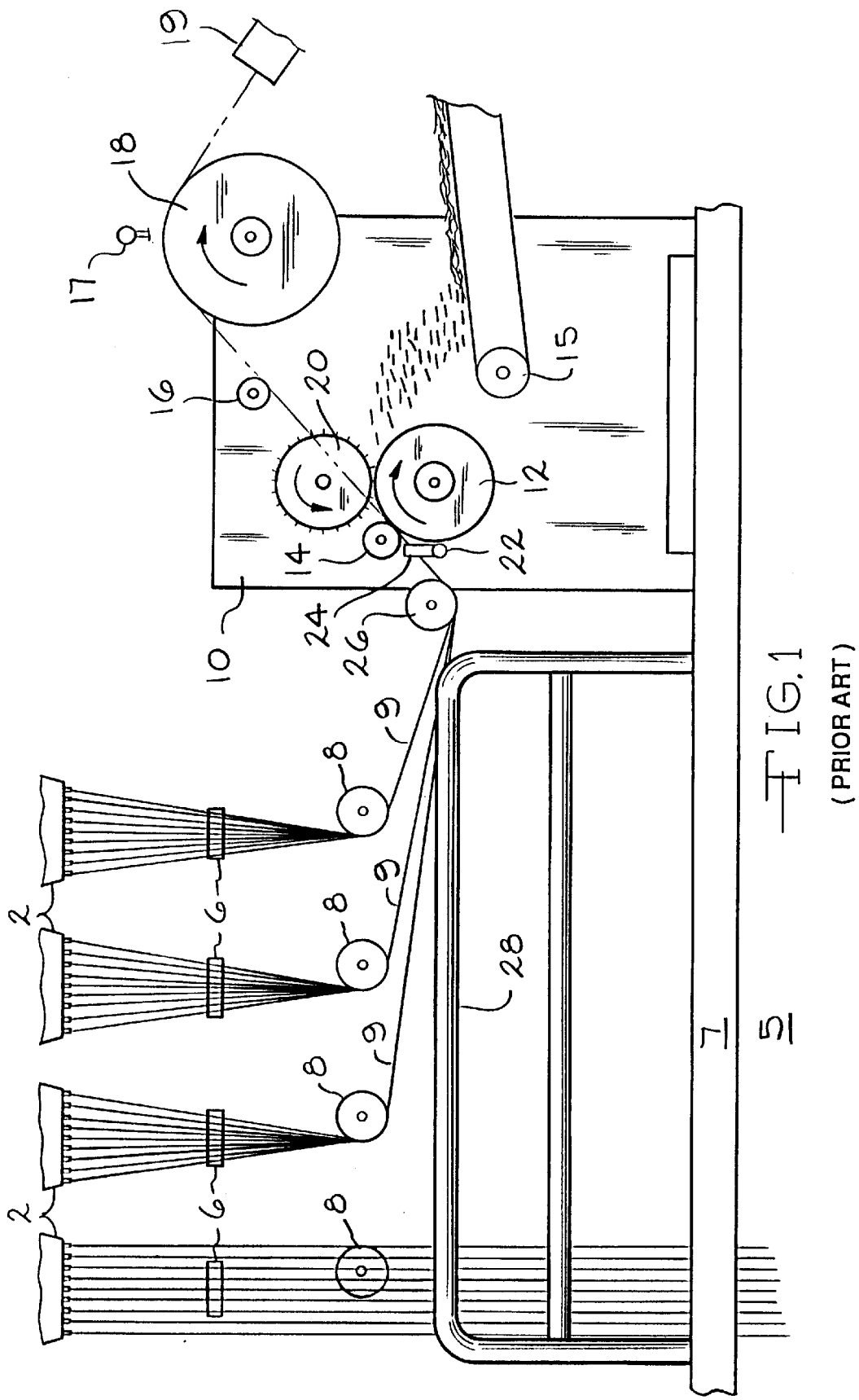
FIG. 1 is a front view of a typical prior art process and equipment for making continuous fiber and wet chopped strand.

FIG. 1 shows a typical process for making wet chopped strand products used in a wet mat machine to make nonwoven mats used to make roofing products, carpet tile, automotive parts and many other products. This process is also used to make dry chop strand for reinforcing plastics, such as polypropylene used to make automotive parts and numerous other products. In this process molten glass flows from a forehearth (not shown) or a plurality of small individual melters (not shown) into precious metal fiberizers 2 and out through tips or nozzles in the bottom of the fiberizer to form either coarse primary fibers 3 or attenuated good fibers 4. FIG. 1 shows only four fiberizers 2, but this kind of operation could have up to 20 or 25 bushings feeding into a chopper with 10–15 being typical. If the bushings are very large in number of tips and/or melt rate, fewer bushings might be serviced by each chopper.

The fiberizer 2 is not running good fibers, but is "hanging", running primary fibers into a basement 5 or scrap hopper (not shown) through an opening in the floor 7. The primary fibers have very large diameters because they have not been attenuated and are not satisfactory for this reason. Once the fiberizer is ready to start making attenuated fibers 4, an operator gathers the primary fibers into a strand, breaks the strand holding on to the portion connected to the fiberizer 2, pulls a chemical sizing applicator 6 into position, pulls the strand under a pad or turning wheel 8 and walks the strand to the chopper 10. The sizing applicator 6 applies any one of a number of known chemical sizings to the surface of the fiber, in a known manner, to protect the surface of the fiber and to make the fiber bond better to the matrix which will surround or bond the fiber together in a later application.

As the operator nears the chopper 10, the operator pulls the strand under a separator roll 26 and up under a guide roller 16 and over an accelerator roll 18, tripping a flipper switch 17 in the process, and putting the strand into a waste chute 19 that directs the strand to the basement 5 or a scrap hopper. The accelerator roll 18 is running at a very slow speed and pulls the strand slowly at first. At a preset time after the flipper switch 17 is tripped, the accelerator roll 18 accelerates rapidly until its surface speed equals the surface speed of a backup roll 12 on the chopper 10. At that time a finger 22 pulls the new strand 9, which is now made up of a plurality of fibers having the desired fiber diameter, between an idler roll 14 running against the surface of the backup roll 12 and also into the nip between a blade roll 20 and the backup roll 12 where the new strand, now containing attenuated fibers 4 of the desired fiber diameter, is severed into chopped strands 27. This can be done manually if desired by pushing the strand, upstream of the nip, with the palm of the hand or a finger into the nip. The finger 22 is moved in the proper direction to do this by the retraction of a cylinder rod 24 by an air or hydraulic cylinder out of sight inside a housing on the chopper 10. The chopped strands 27 are thrown into a box or onto a conveyor 15 which carries the chopped strand 27 to a packaging station or to a dryer.

The fiberizers 2 that are running attenuated fibers 4 will occasionally break out and have to be restarted into the chopper 10 as described above. Also, the backup roll 12, blade roll 20 and idler roll 14 are wearable items and must be replaced periodically. Each has a different life, but the backup roll can wear out after only a few hours on some products. Also, occasionally the chopper drive will fail shutting down the chopper or the chopper will be shut down to service something inside the drive housing needing immediate attention, like belts, bearings, etc. When the chopper is shut down for any reason, it is usually down for several minutes and during this time the fiberizers 2 "hang" which is not good for the fiberizer. When a fiberizer "hangs", the temperature climbs on the bushing and the glass inside because the cooling ambient air flow rate and velocity onto the fiberizer is much less than it is when the fiberizer is running, i. e. when the fiber 4 is being attenuated at speeds usually exceeding 2000 FPM (feet per minute).

When it becomes necessary to shut the chopper down for maintenance, the operator goes to each fiberizer 2 position, grabs the running strand 9 coming from the pad wheel 8 below that fiberizer in a way to allow the strand to be pulled through the hand, breaks the strand in a known way, and drops the new end into the a hole in the floor 7 below the fiberizer, allowing the fiberizer 2 to hang. This process is repeated on each fiberizer 2 serviced by the chopper 10 and when this is completed the chopper 10 can be shut down and serviced. This breaking out procedure causes the operator to walk at least about 30 feet on a 10–14 bushing line and takes about 2–7 minutes typically, depending on the skill of the operator.

When the chopper has been repaired and started back up, it is necessary to start a strand from each fiberizer 2 into the chopper 10 until all fiberizers 2 are running into the chopper 10. This means a lot of walking and lost time until all fiberizers 2 are running into the chopper 10, especially when there are 10 or more fiberizers 2 running into the chopper 10. When the chopper 10 is chopping from 10 fiberizers 2, the farthest fiberizer 2 is more than 30 feet from the chopper 10. Every minute that a fiberizer 2 is not making good product means costly lost productivity because all the costs of good fiber except packaging and freight is being incurred, plus the scrap being generated often has to be taken to land fill which is a substantial added expense.

The present invention solves a long standing problem of this industry caused by "hanging" fiberizers while a chopper or other strand processing equipment serving three or more fiberizers are down or out of service. The production time lost due to the time it takes to walk back and forth to each fiberizer and start a new strand to put the fiberizers back into the chopper when it is put back into service is now saved by using the present invention.

Figure 2:
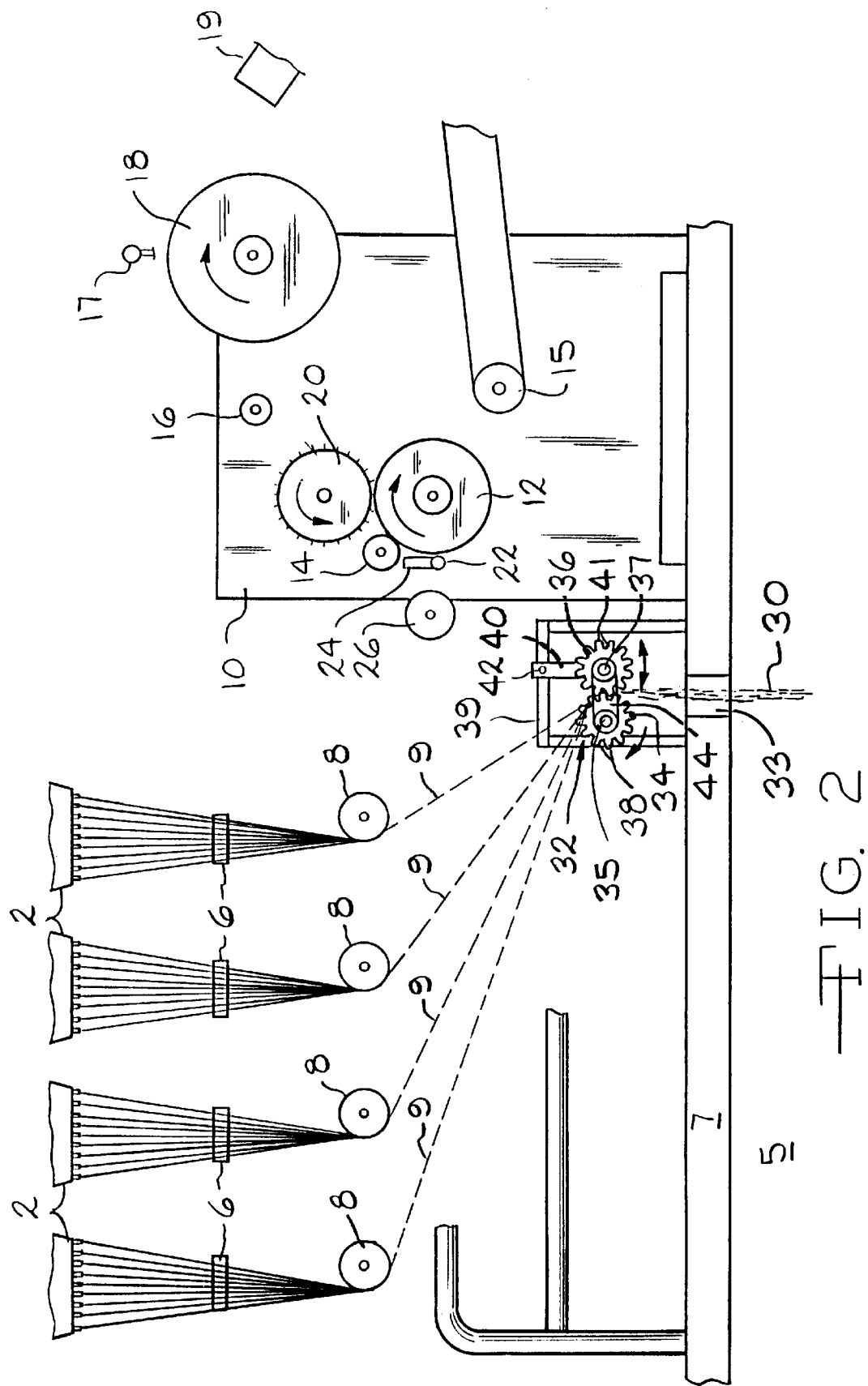
FIG. 2 is a front view of the process shown in FIG. 1, but with a set of pull rolls located upstream of a chopper in accordance with the present invention.

The present invention is illustrated in FIG. 2, which depicts a similar operation as shown in FIG. 1, but in FIG. the chopper 10 is out of service and strands 30 of attenuated fiber are being pulled by a set of pull rolls 32 and fed into the basement 5 through a hole 33 in the floor 7. The set of pull rolls 32 is comprised of two rolls 34 and 36, preferably with saw tooth or serpentine surfaces 38 and 41 respectively as shown. Other surfaces such as soft or foam rubber, urethane or other similar plastic, knurled material like stainless steel, etc. or any material that will grip the strand sufficiently to pull the strands without significant slippage and that will hold up in the wet, abrasive environment is suitable. The teeth or projections on the preferred saw tooth or serpentine surfaces 38 and 41 intermesh to grip the strands 30, which tend to be slippery because of the aqueous chemical sizing on their surfaces, preventing them from slipping past the rolls 34 and 36. The surface of the serpentine, saw tooth, gear, etc. can be a hard material like cast iron or stainless steel or can be a wear resistant rubber or similar material.

Preferably, one of the rolls, in this embodiment roll 34, has a fixed axis 35 and the other roll 36 has a moving axis 37 which can move towards and away from axis 35 as shown by the arrows below roll 36, but both rolls 34 and 36 can have a moving axis if desired. Also, only one of the pull rolls 34 or 36 need be driven by any known manner, preferably with a variable speed drive. It is preferred to drive the roll having a fixed axis, in this case roll 34. A preferred drive assembly will be disclosed in detail later in the description of the most preferred set of pull rolls of the present invention.

In the preferred embodiment shown in FIG. 2, roll 36 is biased against roll 34, to provide a gripping action on the strands 30, by mounting the axis 37 on a support 40 that has a pivot point or pin 42 near one end of the support 40 that is located above or below, and spaced from, axis 37. While the axes of the pull rolls 34 and 36 are aligned horizontally in the preferred embodiment, they can be aligned differently if desired. The axis 35 or axle is mounted to a frame 39, as is the pivot pin 42 on the support 40. The rolls 34 and 36 turn on axes 35 and 37 respectively with the aid of bushings or bearings in a known manner.

The surface 41 or roll 36 is biased against the surface 38 of roll 36 by an elastic band 44 that is shorter than the distance between axis 35 and axis 37 when the surfaces 38 and 41 are in contact without any strands 30 being present. The elastic strip 44, having a hole through the strip near each end, is stretched and each hole slipped over an axis 35 and 37 and retained by a groove in each axis near the end shown, or by any known means. Another elastic strip like strip 44 is also installed on the other end of the axes 35 and 37 if necessary or desired. In this manner, the further away the axis 37 moves from axis 35, the greater the biasing force exerted by the elastic strip(s) 44.

In the method of the present invention, the apparatus shown in FIG. 2 is used in the following way. Referring to FIG. 2, the chopper 10 is running and chopping a plurality of fiberizers 2. When it becomes necessary to shut the chopper down for repair or rebuilding, the strands 30 are grabbed, one at a time by the operator, allowing the strand grabbed to slip through the hand while pulling the strand out of the running chopper by guiding the strand out of the nip between the running blade roll 20 and the backup roll 12 while pulling the strand slowly from the fiberizer 2 and inserting the removed strand into the nip between the rolls 34 and 36 of the set of pull rolls 32. The strand can also be broken without removing the strand from the chopper as is known. When all of the strands 30 have been taken out of the chopper 10 and inserted into the set of pull rolls 32, the chopper is ready to be shut down for repair or rebuilding.

The effective surface speed of the driven pull roll 34, i. e. the speed in length per unit of time of the strand passing through the set of pull rolls 32, can be varied between a few feet per minute (FPM) to several thousand FPM, but preferably the effective drive speed is just fast enough to cause a cooling flow of air to flow into the tip section of the fiberizers 2. This is usually between about 50 and a 300 FPM, such as about 175 FPM. When the chopper 10 has been repaired and started back up, the operator grabs one strand 30 at a time, pulls some slack in the strand, breaks the strand, and inserts strand 30 that is connected to a fiberizer 2, into the chopper 10 in the manner described previously. Instead of putting the leading end of each strand 30 into the waste chute 19, the end of the strand 30 can be pulled back and inserted into the set of pull rolls 32 eliminating the need for waste chute 19. This step is repeated until all of the strands 30 are running into the chopper 10.

Restarting the chopper 10 according to the present invention compared to the conventional method of restarting from hanging fiberizers saves about 7 to 20 minutes of fiberizer production run time for a 14 fiberizer line every time the chopper has to be rebuilt, depending on the operator, the current run time efficiency of the operation and the bead out time of the bushings. Also, typically more than 500 feet of walking by the operator is avoided for a 14 fiberizer line on every chopper shut down and restart.

Figure 3:
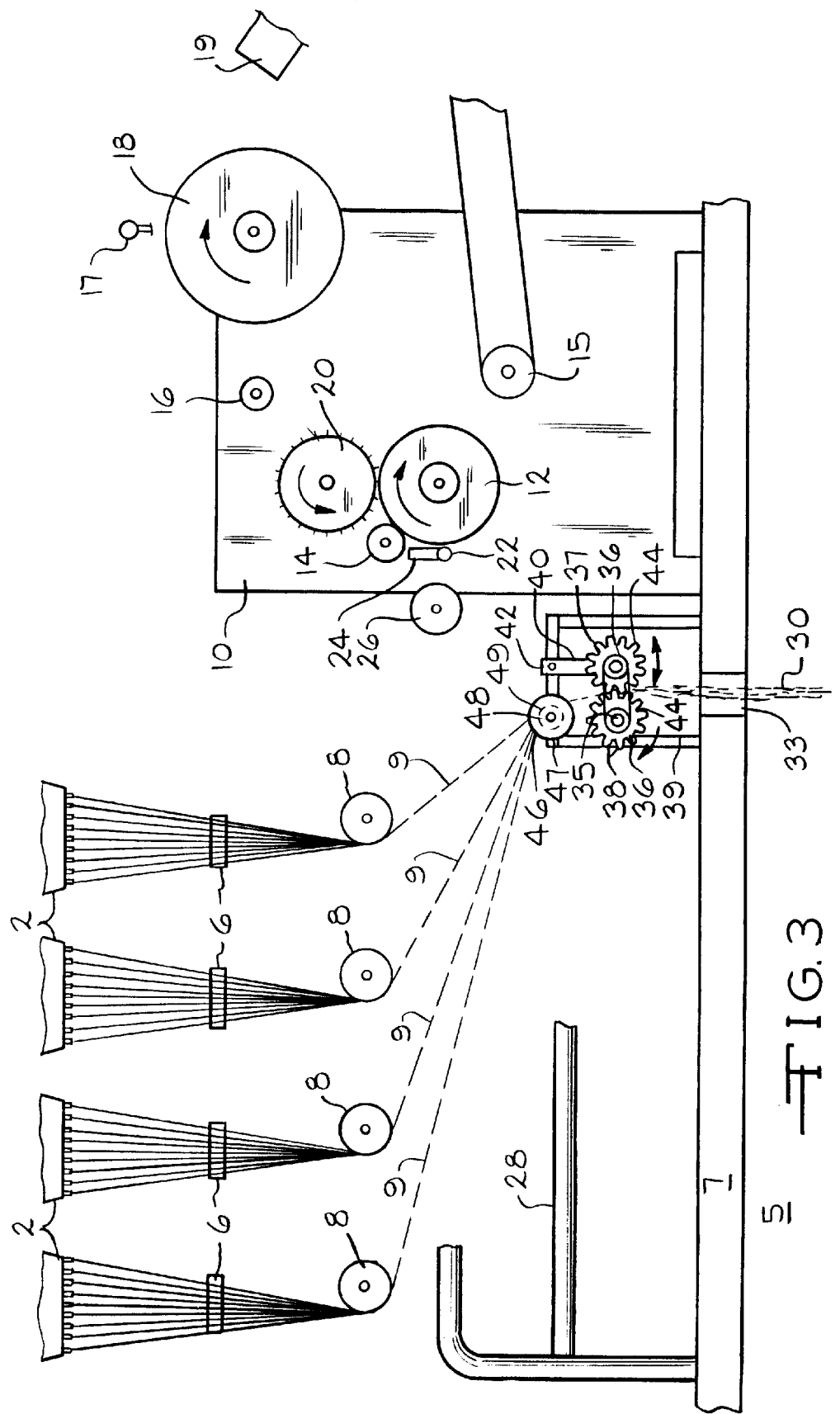
FIG. 3 is a similar view as shown in FIG. 2, but with a guide roll located above the pull rolls in accordance with the present invention.

FIG. 3 shows a further preferred feature of the apparatus of the present invention. This figure is similar to FIG. 2 and the same numbers are used for the common elements, but FIG. 3 shows an additional preferred feature, a guide roll assembly 46 comprised of a guide roll 49 having a flange 47 on each end and supported rotatably on an axis 48 attached to the frame 39. The guide roll 49 can allowed to free wheel on axis 48 by the use of a bushing or bearing or simply a plastic guide roll 49 on a steel axis 48 in a known manner. The guide roll 49 can also be driven if desired as will be shown in a later figure depicting the preferred embodiment. The guide roll 49 allows the strands 30 to be pulled approximately vertically into the nip between the roll 34 and the roll 36 and also allows the strands 30 to be spread out by the operator into a layer one strand deep which allows the nip to pull the strands more uniformly.

FIG. 4 shows a top view of the pull roll assembly shown in FIG. 3 as well as a partial top view of the chopper 10. The only new elements shown in this figure are a conventional variable speed motor and gear drive 45 that is direct connected to the axis 35 of pull roll 34 and conventional bearings 43 for supporting the axis 35. Also, this view shows a valley 31 for a new strand being started into the chopper 10. After the new strand is running into the chopper, the operator moves the new strand to the proper groove 27 on the separator roll 26.

FIG. 5 is a partial front view of the set of pull rolls shown in FIGS. 2 and 3, but with a different way of biasing the pull roll 36 against the pull roll 34. In this embodiment, one or two leaf springs 51 having one end attached to the frame 39 both support the axis 37 and pull roll 36 and provide bias pushing pull roll 36 against pull roll 39. Many other ways of biasing one pull roll against the other pull roll would be suitable as will be obvious to the skilled artisan.

Figure 7:
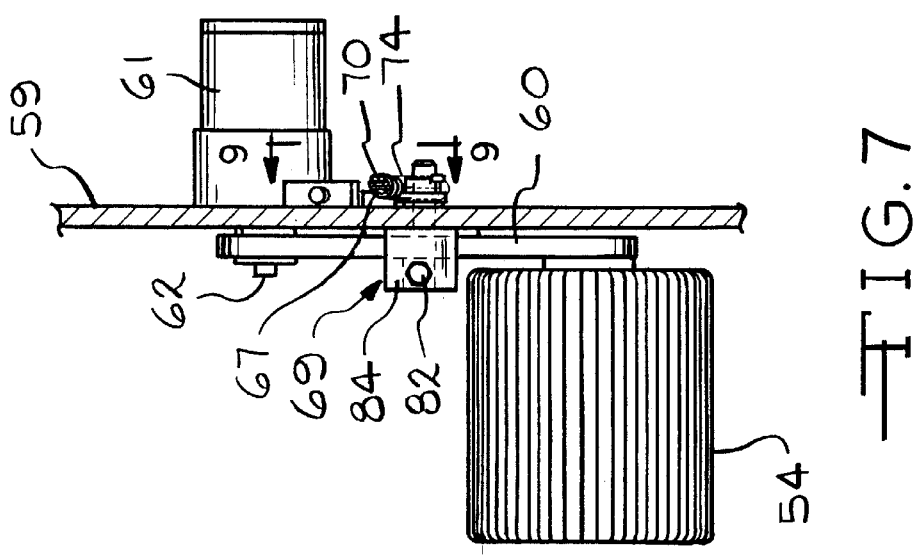
FIG. 7 is a partial cross section of a portion of the apparatus shown in FIG. 6 taken along lines 7—7.

Preferred embodiments are shown in FIGS. 6–9. In the embodiment of FIG. 6, a set of pull rolls 54 and 56 are mounted in a frame 59 having an upright mounting plate 63 rigidly attached to the frame 59. Pull roll 54 can move away from pull roll 56 by being rotatably mounted on to a pivot arm 60. The other end of the pivot arm 60 is pivotally attached a shaft or axle 62 that is mounted in a bearing housing 61 attached to the backside of the upright mounting plate 63 as shown in FIG. 7. The pull rolls 54 and 56 have a serpentine surface 58 in this embodiment.

The surface of the pull roll 54 is biased towards or against the surface of pull roll 56 with a spring arm assembly 69 cooperating with a slot 64 in the pivot arm 60. The amount of movement of the pivot arm 60 can be controlled, and thus how close the surface of the pull roll 54 runs with the surface of pull roll 56 can be adjusted by turning the threaded bolt 70 clockwise to increase the spacing between the pull rolls and counterclockwise to decrease the spacing. The threaded bolt 70 turns in a threaded nut 72 which is welded or otherwise attached to cross arm 74 that is attached to the upright mounting plate 63 member. A stop 68 welded or otherwise attached to the pivot arm 60 near an edge closest to the bolt 70 works against of the end of the bolt 70 to limit the movement of the pivot arm 60 in one direction. This pivot arm movement limiting mechanism is optional and is merely to limit the amount of stress on the bearing of the driven pull roll 56. It can be eliminated or rendered inactive by backing the bolt 70 off until the surfaces 58 of the two pull rolls 54 and 56 are in contact with no strands running.

Figure 9:
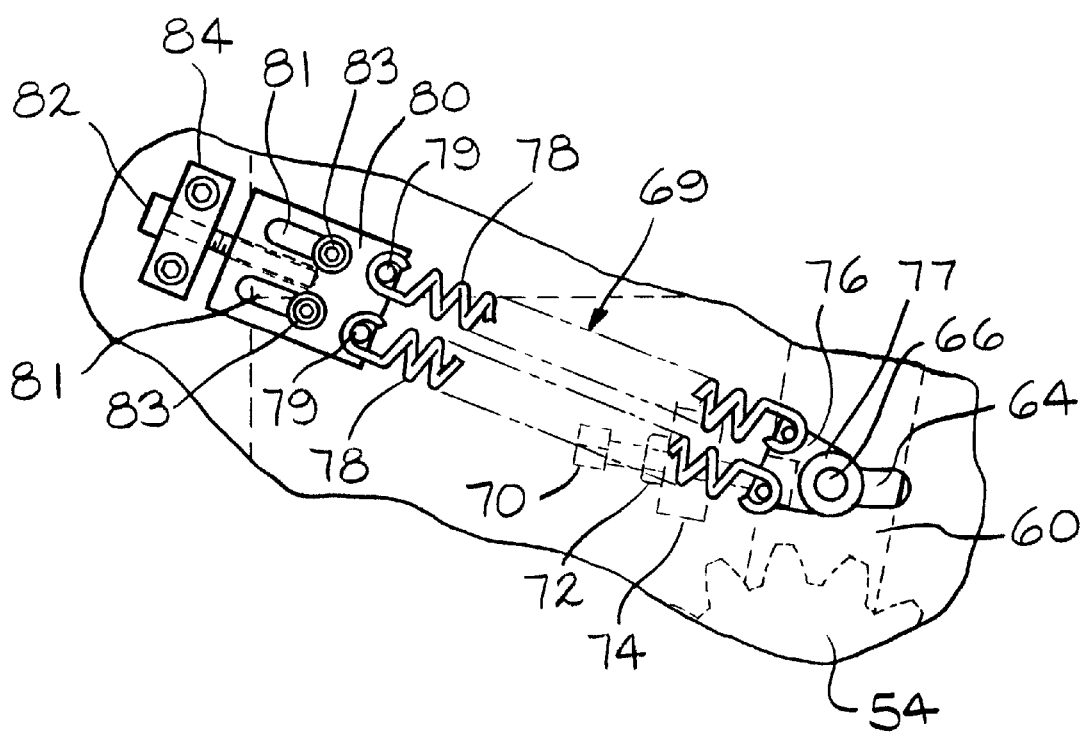
FIG. 9 is a partial cross section of portion of the apparatus shown in FIG. 7 taken along lines 9—9 to show a preferred biasing apparatus of the present invention.

The preferred spring arm assembly 69 is shown in more detail in FIGS. 7 and 9. Assembly 69 also includes an end plate 76 to which anchor bolts 65 are attached for mounting one or more tension springs 78 or equivalent tensioning means. A keeper sleeve 77 is rigidly attached to the end plate 76 within which pin 66 resides, being free to rotate slightly as needed when a larger bundle of strands of fiber running in the set of pull rolls causes the pivot arm 60 to move moving the pin 66 in the slot 64. The pin 66 is rigidly attached, such as by welding, etc., to the back side of the pivot arm 60. The pin 66 passes through a slot 64 in the upright mounting plate 63. and has a keeper sleeve 77 attached to the end of the pin 66 to keep the pin 66 in the slot 64. The slot 64 is arched such that the center line of the slot 64 is a radius with the axis of the axle 62. The pin 66 also passes through a washer 67 located between the pivot arm 60 and the upright mounting plate 63 to help keep the pivot arm 60 parallel with the upright mounting plate 63.

The other end of the spring arm assembly 69 is attached to the upright mounting plate 63 with a second cross arm 84 and a second threaded bolt 82 which passes through an unthreaded hole in the second cross arm 84, a second end plate 80 on which anchor bolts 79 are mounted to hold the other end(s) of the tension springs 78. The threaded portion of the second threaded bolt 82 engages a threaded hole in the second end plate 80 such that when the second threaded bolt 82 is turned clockwise it pulls the second end plate 80 towards the second cross arm 84, stretching and adding tension to the tension springs 78. This action is used to adjust the amount of force applied to the pivot arm 60 and thus the amount of bias applied to force the surface of the pull roll 54 into or towards the surface of the pull roll 56. The second end plate 80 optionally has one or more slots 81 to allow one or more optional guiding pins 83, attached to the upright mounting plate 63, to pass through. This arrangement insures that the second endplate 80 remains in the desired orientation.

The tension in the springs 78 bias the surface of the pull roll 54 against the surface of pull roll 56. The more the bolt 82 is turned clockwise, the greater the magnitude of bias, the tighter the surfaces of the pull rolls will grip the strands 9 that the pull rolls pull and the greater the opposing force will be when the diameter of the strands 9 increases, forcing the axes of the pull rolls 54 and 56 farther apart.

The preferred set of pull rolls illustrated in FIGS. 6–9 can also optionally be mounted on wheels 88 that are rotatably mounted on shafts 90, each shaft 90 being attached a lower corner of a base 57 on which the frame 59 is mounted rigidly. The rotatable wheels 88 allow the set of pull rolls to be easily moved back out of alignment with strands 9 to be out of the way when the set of pull rolls are not needed and then easily and quickly moved back into alignment with strands 9 to serve as pull rolls for pulling the strands 9. The wheels 88 on each side of the base 57 align with each other and the wheels 88 on one side of the base 57 are parallel with the wheels 88 on the opposite side of the base 57. The wheels 88 on at least one side of the base 57 have a V-shaped groove around their circumference and ride on an V-shaped inverted angle iron or rails 92 which serves to allow the set of pull rolls to be moved back and forth on a desired path.

Figure 8:
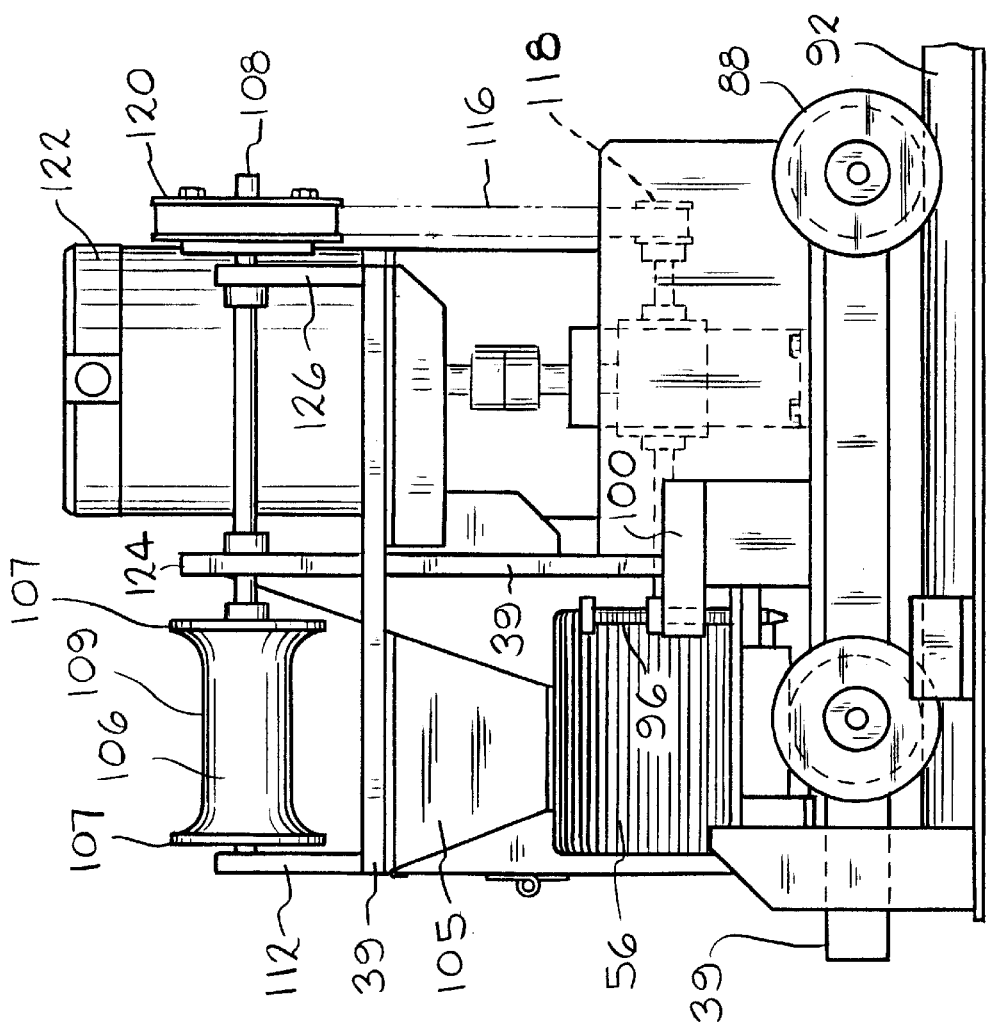
FIG. 8 is an end view of the preferred pull roll apparatus shown in FIG. 6.

In this preferred embodiment, to keep the set of pull rolls from tilting or moving along the V-shaped inverted angle iron rails 92, due to the tension in the strands 9 when the pull rolls 54 and 56 are pulling some or all of the strands 9, a V-shaped angle iron 94 is movably and adjustably mounted above the groove in one or both front wheels 88. An end of a threaded bolt 96 is attached to a plate that is welded or otherwise attached to the angle 94. The threaded bolt 96 is threaded through a nut 98 that is welded to a bracket 100 attached to the side of the frame 59. When the set of pull rolls are in the desired position to pull strands 9, the threaded bolt is turned in nut 98 to lower the V-shaped angle 94 to engage the V-shaped groove in the wheel 88 to hold the set of pull rolls in place. If desired, a similar means of holding the opposite front wheel 88 onto its rail 92 can be utilized with the same or a different known manner of moving the V-shaped angle 94. While FIGS. 6 and 8 show using grooved wheels 88 resting on angle rails 92 on both sides of the base 57 of the frame 59, it is also feasible and in some cases desirable to use grooved or smooth wheels on one side of the base 57 and rest them on a flat strip of steel, such as the strip 93, raised to be at the proper elevation to keep the base 57 approximately level. Using grooved wheels 88 and angle rails 92 on both sides of the base 57 can cause binding problems if angle rails 92 are not kept in exact alignment. This is avoided by using a flat rail on one side.

Referring to the preferred embodiments depicted in FIGS. 6 and 8, the set of pull rolls is equipped with a guide roll 106 for the strands 9 having flanges 107 and a working surface 109 like the guide roll described earlier. The guide roll 106 is mounted on a guide roll axle 108 that is mounted in bearings in a C-shaped support 112 attached to a vertical member of the frame 59 with an angle bracket 114 by any known suitable means. An optional strand support chute 105 is located under the path of the strands as they pass from the guide roll 106 to the nip between the pull rolls 54 and 56 and is preferably made of stainless steel. The guide roll 106 can be optionally rotated at a slow speed to aid in the pulling of the strands 9 and to promote uniform wear on the surface of the guide roll 108. The guide roll axle 108 has a flat grooved pulley 120 mounted near one end opposite the portion on which the guide roll 106 is mounted. The axle 108 is also optionally supported by bearings mounted on an outboard support 126 that is attached to the frame 59 in any known manner.

A flat grooved pulley 118 is mounted on a guide roll drive shaft 121 coming from a gear case 119 opposite a pull roll shaft 123 for the pull roll 54. The flat grooved pulley 118 is on the same side and aligned with the pulley 107 which also has a flat groove 120. The strand guide roll 106 is rotated with a belt 116 which can be an automotive timing belt. The gear case 119 is driven by an electric motor 122, preferably a variable speed motor, via main drive shaft 124. By changing the kinds of pulleys, other kinds of belts, chains etc., can be used in a known manner. Any reasonable known kind of drive would be suitable for the guide roll and the pull roll(s). Preferably, the pull roll drive has a capacity to vary the surface speed of the pull roll 54 and the surface speed of surface 109 of the guide roll 106 within a range of about 50 to 1000 or more FPM, most preferably from about 50 to about 500 feet per minute. The surface speed of the guide roll 106 can be lower than the surface speed of the pull roll if desired. A typical running speed is about 175 FPM.

One skilled in the art will recognize other modifications that will work without changing the concept and results of the invention. Such is intended to be included in the scope of the following claims.

What is claimed is:

1. A method of making chopped fiber from a molten material comprising passing the molten material through holes or tips in at least three generally aligned fiberizers, pulling said fibers away from each of the fiberizers and gathering and turning the fibers from at least some of the fiberizers with a turning wheel located generally below each fiberizer to form at least one strand of fibers from each of the at least some of the fiberizers, and chopping the strands of fibers into desired lengths by feeding each strand into a chopper, said chopper having a strand accelerator roll, a back up roll and a blade roll wherein each of the at least three strands are pulled by said accelerator roll on the chopper and then fed into a nip between said back up roll and said blade roll after being accelerated by the accelerator roll, the improvement comprising removing all of the strands from the chopper when the chopper is to be shut down for maintenance by removing the at least three strands coming from the three or more fiberizers from the chopper and putting all of the strands into a set of pull rolls which continue to pull all of the strands, stopping and maintaining the chopper, said set of pull rolls being located between a plane that intersects the strands and the center of a fiberizer closest to said chopper and said chopper, wherein axes of the pull rolls in said set of pull rolls being at a level vertically lower than axes of said blade roll and said back up roll of said chopper, an axis of one pull roll being movable with respect to an axis of the other pull roll and a working surface of one pull roll being biased towards a working surface of the other pull roll, and then starting the chopper back up, removing all of the strands from said set of pull rolls and starting them back into the chopper.

2. The method of claim 1 wherein a surface of each of said pull rolls that contacts said strands is serpentine in shape producing ridges and valleys running parallel with the axes of the two pull rolls and wherein the ridges of one of said pull rolls intermeshes with the valleys of the other pull roll to provide more pulling friction with surfaces of said strands.

3. The method of claim 1 wherein a surface of each of said pull rolls that contacts said strands is saw toothed in shape and wherein the teeth of one of said pull rolls intermeshes with the teeth of the other pull roll to provide more pulling friction with surfaces of said strands.

4. The method of claim 2 wherein said set of pull rolls also comprises a rotatable guide roll mounted above a nip formed by the two pull rolls.

5. The method of claim 4 wherein said guide roll is driven.

6. The method of claim 5 wherein said guide roll is driven by the same drive that drives the pull roll.

7. The method of claim 1 wherein the surface of one pull roll is biased against the surface of the other pull roll with an adjustable spring mounted in an arm that supports one of the pull rolls in a pivoting manner.

8. The method of claim 1 wherein the surface of one pull roll is biased against the surface of the other pull roll by attaching end portions of at least one stretched elastic member to either an axis of each pull roll or by attaching one end portion to an axis of a fixed pull roll and the other end portion to a member attached to the axis of a movable pull.

9. The method of claim 1 wherein the drive for said at least one pull roll is a variable speed drive.

10. The method of claim 1 wherein said set of pull rolls is mounted on an assembly that permits said set of pull rolls to be moved into a first position where a vertical plane through the strands running into said chopper will intersect the axes of said pull rolls and to a second position where said plane does not intersect the axes of said pull rolls and wherein said pull rolls are moved into said first position before or while said chopper is shut down and to said second position when said chopper is once again chopping the strands.

11. The method of claim 1 wherein there are four or more generally aligned fiberizers and four or more strands from the four or more fiberizers are pulled together at the same time by said set of pull rolls.

12. The method of claim 1 wherein there are five or more generally aligned fiberizers and five or more strands from the five or more fiberizers are pulled together at the same time by said set of pull rolls.

* * * * *